United States Patent [19]
Wendt et al.

[11] Patent Number: 6,146,782
[45] Date of Patent: Nov. 14, 2000

[54] FUEL CELL ANODE FOR THE OXIDATION OF METHANOL

[75] Inventors: Hartmut Wendt, Dieburg; Michael Götz, Darmstadt, both of Germany

[73] Assignee: Degussa-Hüls Aktiengesellschaft, Frankfurt am Main, Germany

[21] Appl. No.: 09/289,604

[22] Filed: Apr. 12, 1999

[30] Foreign Application Priority Data

Apr. 15, 1998 [DE] Germany ............ 198 16 622

[51] Int. Cl.$^7$ ................................. H01M 4/92
[52] U.S. Cl. ................... 429/42; 429/43; 429/40; 324/378
[58] Field of Search ............ 429/40, 42, 43; 324/378

[56] References Cited

U.S. PATENT DOCUMENTS

| | | | |
|---|---|---|---|
| 4,427,523 | 1/1984 | Oda | 429/42 |
| 4,804,592 | 2/1989 | Vanderborgh | 429/42 |
| 5,151,515 | 9/1992 | Cisar | 429/42 |
| 5,171,644 | 12/1992 | Tsou | 429/42 |
| 5,358,803 | 10/1994 | Abraham | 429/43 |
| 5,683,829 | 11/1997 | Sarangapani | 429/42 |

FOREIGN PATENT DOCUMENTS

WO 97/21256  6/1997  WIPO.

OTHER PUBLICATIONS

Malinski, et al., "Characterization of Conductive Polymeric Nickel (II) Tetrakis (3–Methoxy–4–Hydroxy–Phenyl) Porphyrin as an Anoic Material for Electrocatalysis," *Journal of the Electrochemical Society*, vol. 138, No. 7, Jul. 1991, pp. 2008–2015.

Sarangapani, et al., "Macrocyclic Redox Promoters for Direct Methanol Fuel Cells –Part II," Extended Abstracts, U.S., *Electrochemical Society*, Pennington, New Jersey, May 21–26, 1995, Bd. 95/1, 1995, pp.733–734.

Bett, et al., "Platinum–Macrocycle Co–Catalysts for the Electrochemical Oxidation of Methanol," *Electrochemical Acta*, vol. 43, No. 24 (1998), pp. 3645–3655.

H. Jahnke, Organic Catalysts for Fuel Cells 1971, Batelle, Frankfurt, Information hefte 11, 62.

*Primary Examiner*—Bruce F. Bell
*Attorney, Agent, or Firm*—Smith, Gambrell & Russell, LLP

[57] ABSTRACT

A fuel cell anode for the oxidation of methanol, which contains at least one platinum metal or alloys of platinum metals as the primary, catalytically active component. The anode is characterized in that it also contains transition metal complexes of phthalocyanine or substituted phthalocyanines as cocatalyst, these amplifying the catalytic effect of the platinum metals and their alloys for the anodic oxidation of methanol.

17 Claims, 4 Drawing Sheets

FUEL CELL ANODE FOR THE OXIDATION OF METHANOL

INTRODUCTION AND BACKGROUND

The present invention relates to a fuel cell anode for the oxidation of methanol, which contains at least one platinum metal or alloys of platinum metals as the primary, catalytically active component.

The direct anodic oxidation of methanol, which is especially important for the use of membrane fuel cells as sources of power for automobiles, requires uneconomically large loadings of noble metals in the anode, even when the direct methanol cell is operated at a greatly increased temperature; namely, at 130° C. [W. Preidel, K. Mund, K. Pantel, G. Starbeck, G. Luft, M. Waidhas, VDI report 1174 211 (1995)]. The state of the prior art teaches the use of an alloy catalyst on a carbon black support which contains platinum and ruthenium as cocatalyst in the molar ratio of 1:1 [H. -F. Oetjen, V. Schmidt, U. Stimming, F. Trila, J. Electrochem. Soc. 143, 3 83 8 (1996)].

The platinum component on the surface of the alloy crystallites, which are dispersed on a nano-scale on the carbon black, is used substantially for chemisorptively caused cleavage of the C-H bond in the methanol molecule whose oxidative degradation ultimately leads to the production of carbon monoxide, or a species which is closely related to carbon monoxide, and poisons the platinum as a result of strong absorptive bonding thereto [S. Wilhelm, T. Iwasita, W. Vielstich, J. Electroanal. Chem. 238, 383–391 (1987)].

Ruthenium forms surface oxides by anodic oxidation significantly more readily than does platinum (at about +500 mV against a reversible hydrogen electrode (RHE= Reversible Hydrogen Electrode), compared with +800 mV against a RHE for platinum) and is capable of transferring the oxygen in the surface oxide to carbon monoxide which is very mobile on the surface of the catalyst [K. A. Friedrich, K. -P. Geyzers, U. Linke, U. Stimming, J. Stumper, J. Electroanal. Chem. 402, 123–128 (1996)]. This is then oxidized to only very weakly absorbed carbon dioxide and thereby partly counteracts the poisoning of the catalyst caused by CO absorption.

The disadvantage of using ruthenium as a cocatalyst is the fact that, at temperatures of 80 to 100° C., the conventional range for the operating temperature of pressureless operating membrane fuel cells, it is not possible for the open-circuit potential of the methanol anode to get within less than +300 mV of the equilibrium potential of methanol oxidation, due to the still relatively too high equilibrium potential of ruthenium oxide formation, which is why cell operation threatens to become uneconomical due to too high a loss of power. In addition, the use of a second noble metal from the group of platinum metals as a cocatalyst is too expensive due to the high stoichiometric ratio required for use in fuel cells.

It has been known for some time, from fundamental investigations, e.g., by Sandstede [G. Sandstede ed., from Electrocatalysis to fuel cells, University of Washington Press, Seattle, London, 1971] and more recently by Tseung [P. K. Shen, A. C. C. Tseung, J. Electrochem. Soc. 141, 3082 (1994)] that non-platinum metals are also suitable as cocatalysts for the anodic oxidation of methanol catalyzed by platinum. These findings have also been demonstrated with catalysts on carbon black or activated carbon supports in membrane fuel cells [M. Götz, H. Wendt, in Gesellschaft deutscher Chemiker Monographie vol. 10, ed. by F. J. Kruger, published 1988]. It has been shown, however, that a cocatalytic effect which is comparable to that of ruthenium, even using the cocatalytically most active elements, in particular tungsten and molybdenum for methanol and tin for anodic CO oxidation, cannot be achieved.

Therefore, an object of the present invention is to provide a fuel cell anode using a cocatalyst for the electrocatalytic oxidation of methanol in acid electrolytes, in particular in acid ionomer electrolytes such as NAFION®, which produces comparable or better performance data than a fuel cell anode with a Pt/Ru catalyst and which is resistant to poisoning of the platinum.

SUMMARY OF THE INVENTION

The above and other objects of the present invention can be achieved by a fuel cell anode for the oxidation of methanol which contains a platinum metal or alloys of platinum metals as the primary, catalytically active component. The anode is characterized in that it also contains transition metal complexes of phthalocyanine or substituted phthalocyanines as a cocatalyst, which amplify the catalytic effect of the platinum metals and their alloys for the anodic oxidation of methanol.

Platinum, ruthenium or palladium are particularly suitable as platinum metals. They may be present individually or in binary or ternary combinations and/or as alloys.

Nickel, iron and cobalt are used as preferred transition metals. In a special embodiment of the invention, these transition metals are present as phthalocyanine complexes or as complexes of phthalocyanine tetrasulfonic acid.

BRIEF DESCRIPTION OF DRAWINGS

The present invention will be further understood with reference to the accompanying drawings, wherein.

DETAILED DESCRIPTION OF INVENTION

Figure 1:
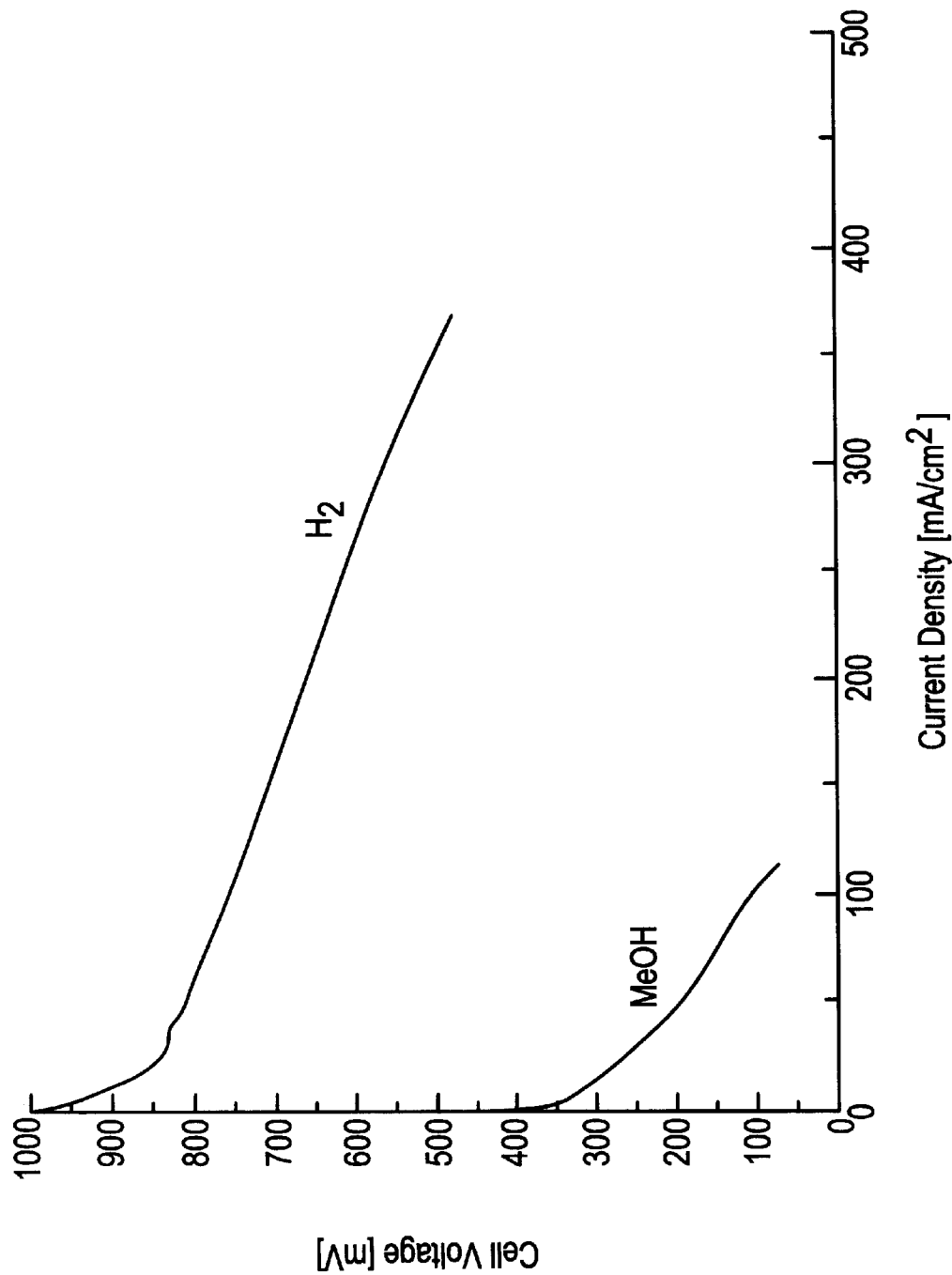
FIG. 1 is a current/voltage curve for the fuel cell in comparison example 1 when supplying the anode with moist hydrogen ($H_2$) and with a mixture of water vapor and methanol (MeOH)

The present invention will now be described in greater detail.

The transition metal complexes to be used according to the invention lead to a clear cocatalytic effect during direct anodic oxidation of methanol which is comparable to that of ruthenium in platinum/ruthenium alloy catalysts. This cocatalytic effect is also clearly increased when the cocatalytically active transition metal complex, in the absorbed state on carbon black, is subjected to mild pyrolysis at 700° C. in an atmosphere of nitrogen.

The catalytic effect of phthalocyanine complexes of the elements nickel, iron and cobalt during the cathodic reduction of oxygen in acid fuel cells has been known for a long time [K. Wiesener, D. Ohms, Electrocatalysis of the cathodic oxygen reduction in: H. Wendt, ed., Electrochemical Hydrogen Technologies, Elsevier, 1990, 63–103]. Similarly, their cocatalytic effect for the anodic oxidation of carbon monoxide in alkaline medium is also known [H. Jahnke, M. Schönbom, G. Zimmermann in Topics in current chemistry 61, Springer Verlag Heidelberg 1976, 133].

In acid electrolytes, only the catalytic effect of cobalt dihydrodibenzotetraazulene during the anodic oxidation of formate, oxalate and hydrazine has been detected [H. Jahnke, M. Schönbom, G. Zimmerman in Batelle, Frankfurt, Informationshefte 11 (1971), 62]. Only very low catalytic activities were found for the anodic oxidation of formaldehyde and carbon monoxide.

Thus, in the literature, there is only one reference relating to the catalytic effect of similar complexes to those in accordance with the invention, for the anodic oxidation of formaldehyde, formic acid and oxalic acid by cobalt dihydrodibenzotetraazulene, but no catalytic effect is reported for the oxidation of methanol. This can probably be attributed to the fact that the catalytic effect of these phthalocyanine complexes or their pyrolysis products during the cathodic reduction of oxygen depends on a different molecular mechanism from their cocatalytic effect during the anodic oxidation of methanol catalyzed by platinum, since the electrode potentials at which the two different reactions proceed differ considerably (+800 to 900 mV against RHE for the cathodic reduction of oxygen and +400 to +600 mV for the anodic oxidation of methanol).

According to the invention, the plating metals and cocatalysts to be used for fuel cell anodes are used as supported catalysts on a high surface area, conductive support material such as carbon black or activated carbon. The preparation of these types of catalyst/cocatalyst systems supported on carbon black or activated carbon black is possible by using a relatively simple process which depends on the absorption of suitable transition metal phthalocyanine complexes on carbon black or activated carbon black, which process is associated with the advantage of low expenditure on apparatus, and a platinum catalyst deposited onto carbon black or activated carbon on the nano-scale, prepared by a routine process, can be used as the starting material. The crystallite sizes of the platinum metal on the support material are in the range between 1 and 5 nm.

The stoichiometric ratio of transition metal phthalocyanine complex to platinum metals is preferably between 0.3:1 and 1:3.

The following examples illustrate the preparation according to the invention and mode of action of transition metal porphyrin complexes and their pyrolysis products as cocatalysts for the anodic oxidation of methanol.

COMPARISON EXAMPLE 1

In accordance with DE 196 115 90, an ink which contains a commercially available carbon-supported platinum catalyst (20 wt. % platinum loading), glycerine, water and the tetrabutylammonium salt of NAFION® dissolved in isobutanol, is sprayed onto both faces of a NAFION® membrane type 115 so that the platinum loading in the membrane/electrolyte assembly (MEA), on each of the two faces, is 0.4 mg/cm$^2$. The sprayed electrodes are formed by boiling in 10 wt. % sulfuric acid, the sulfuric acid is removed by washing and the electrodes are incorporated into a laboratory fuel cell with an active surface area of 5×5 cm$^2$. The cathode is supplied with oxygen and the anode is supplied either with moist hydrogen (for comparison) or with a mixture of water vapor and methanol (50:1 mol:mol). The current/voltage curves for the cells were measured at 95° C. (curves in FIG. 1).

COMPARISON EXAMPLE 2

Figure 2:
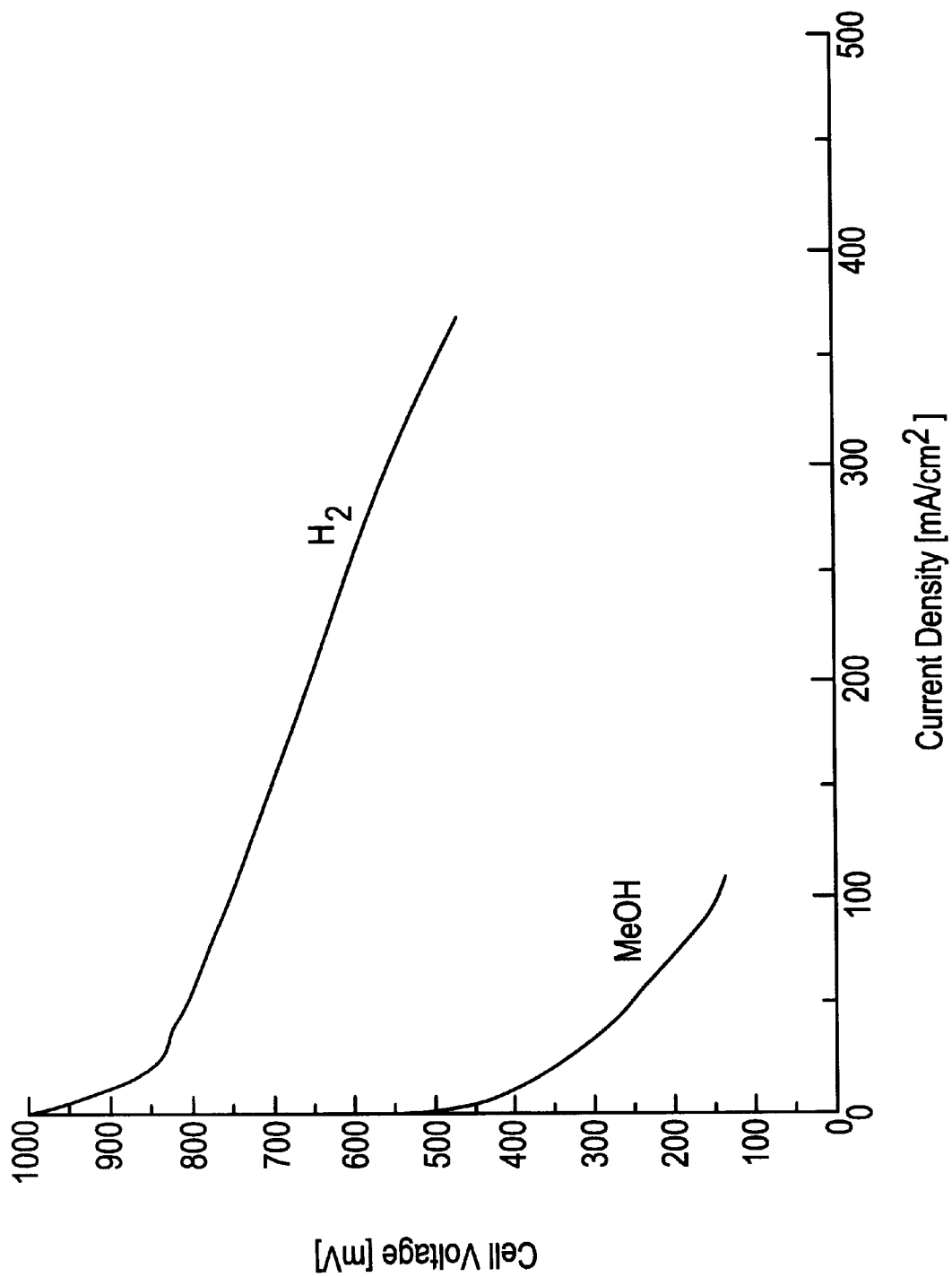
FIG. 2 is a current/voltage curve for the fuel cell in comparison example 2 when supplying the anode with moist hydrogen ($H_2$) and with a mixture of water vapor and methanol (MeOH)

Using the method described, an MEA with anodes comprising a commercially available carbon black is prepared, this being activated with 20 wt. % of nano-dispersed Pt/Ru (1:1 mol:mol). The cathode is prepared from Pt-activated carbon black (20 wt. %) in the same way as in the first example. The noble metal loading on each face of the MEA is 0.4 mg/cm$^2$ of noble metal (i.e., Pt or Pt+Ru). The current/voltage curves of cells for hydrogen or water vapor/methanol operation are given in FIG. 2. A clear improvement can be detected, that is an increase in the power density for the Pt/Ru catalyst as compared with Pt alone when operating with methanol.

EXAMPLE 1

A commercially obtainable Pt catalyst (20 wt. % on carbon black), like the one used in comparison example 1, is doped with a nickel phthalocyanine tetrasulfonate complex in the stoichiometric ratio Pt:complex of 4:1 mol/mol, by absorption from an aqueous solution of the complex. The solvent can be separated from the catalyst either by distillation or filtering or centrifuging. Preparation of the MEA is completed in the manner described above. The platinum loading of the anode face is 0.4 mg/cm$^2$ and that of the complex is 0.5 mg/cm$^2$. The current/voltage curves for the fuel cell for this and the preceding examples, operating with methanol, are compared with each other in FIG. 3. The power densities which are produced with platinum and the complex are much higher than that of the anodes activated with platinum alone. However, the current densities which are produced with Pt/Ru anodes are not achieved.

EXAMPLE 2

The mixed catalyst described above, which contains platinum and a nickel phthalocyanine tetrasulfonate complex in the molar ratio of 4:1, was maintained at 700° C. for one hour under an atmosphere of nitrogen. Pyrolytic decomposition of the complex was achieved in this way. MEA anodes with a platinum loading of 0.4 mg/cm$^2$ are prepared from the catalyst treated in this way. The current/voltage curves for a cell in which water vapor/methanol is supplied to the anode face once again demonstrates an increase in current density and this is in a range comparable to that of the current/voltage curves of the Pt/Ru (1:1) catalyst (see FIG. 3).

EXAMPLE 3

Platinum/palladium mixed catalysts are used for the anodic oxidation of hydrogen with a concentration of up to 1% carbon monoxide in the hydrogen in phosphoric acid fuel cells at 200° C. (P. Stoneheart, Ber. Bunsenges. Physikal. Chem. 94 (1990), 913).

Figure 3:
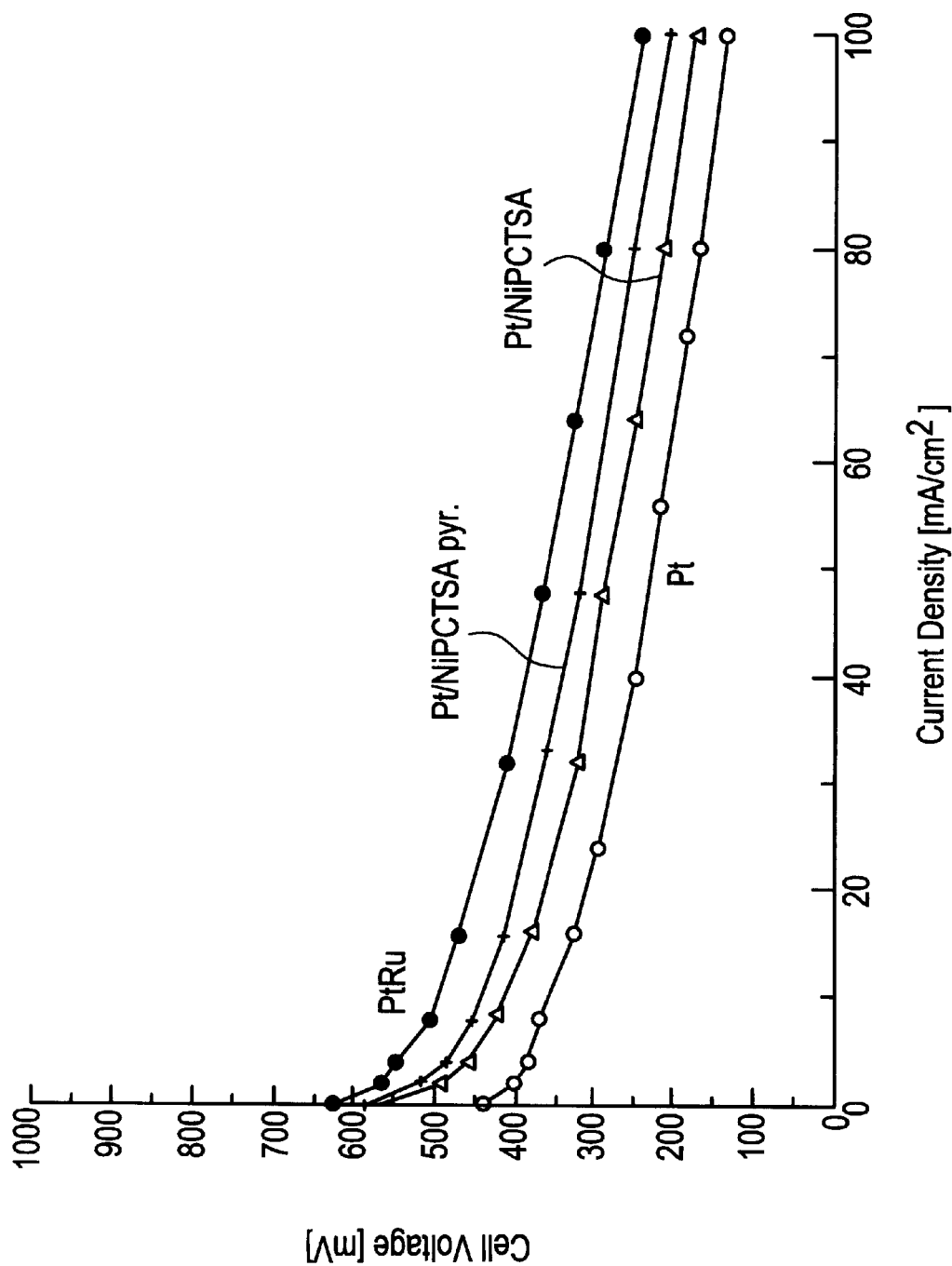
FIG. 3 is a current/voltage curve for the fuel cells in comparison example 1 (Pt), comparison example 2 (PtRu), example 1 (Pt/NiPCTSA) and in example 2 (Pt/NiPCTSA pyr.)
Figure 4:
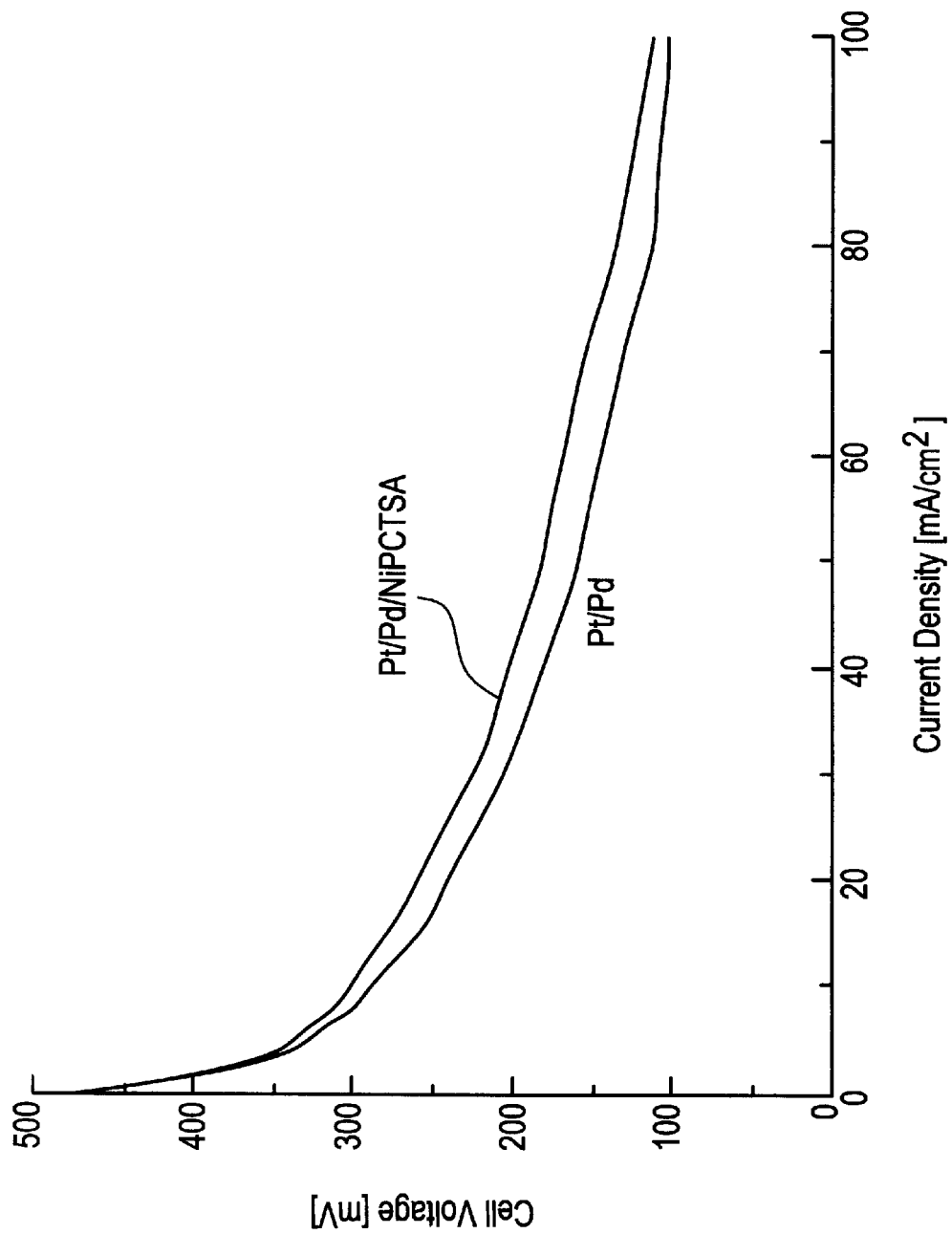
FIG. 4 is a current/voltage curve for fuel cells with platinum/palladium alloy catalysts in accordance with the prior art (Pt/Pd) and in accordance with the invention (Pt/Pd/NiPCTSA).

As can be seen from a comparison of FIGS. 3 and 4, the Pt/Pd alloy catalyst catalyzed the anodic oxidation of methanol less efficiently than platinum at the same total loading of nickel phthalocyanine in the mola ratio of complex:noble metal=1:4 promoted the anodic oxidation of methanol. Pyrolysis of the complex at 700° C. also proved to be beneficial in this case.

Further variations and modifications will be apparent to those skilled in the art from the foregoing and are intended to be encompassed by the claims appended hereto.

German priority application 198 16 622.2 is relied on and incorporated herein by reference.

We claim:

1. A fuel cell anode for the oxidation of methanol, comprising at least one platinum metal or an alloy of a platinum metal as the primary, catalytically active component, and a transition metal complex of phthalocyanine or a substituted phthalocyanine as cocatalyst.

2. The fuel cell anode according to claim 1, wherein the transition metal complex is a phthalocyanine complex of at least one of nickel or cobalt, or at least one of nickel or cobalt complex of phthalocyanine tetrasulfonic acid.

3. The fuel cell anode according to claim 2 wherein at least one of the platinum metals selected from the group consisting of platinum, ruthenium and palladium is the primary, catalytically active component.

4. The fuel cell anode according to claim 2 wherein the primary, catalytically active component is a member selected from the group consisting of binary, ternary combination and alloys of the metals platinum, palladium and ruthenium.

5. The fuel cell anode according to claim 2 wherein the primary, catalytically active component and cocatalyst are present as a dispersion on the nano-scale with average crystallite sizes in the range from 1 to 5 nm, on a high surface area, conductive support material.

6. The fuel cell anode according to claim 1, wherein the transition metal complex is a pyrolyzed complex of at least one of nickel or cobalt complex of phthalocyanine or substituted phthalocyanine.

7. The fuel cell anode according to claim 6 wherein at least one of the platinum metals selected from the group consisting of platinum, ruthenium and palladium is the primary, catalytically active component.

8. The fuel cell anode according to claim 6 wherein the primary, catalytically active component is a member selected from the group consisting of binary, ternary combination and alloys of the metals platinum, palladium and ruthenium.

9. The fuel cell anode according to claim 6 wherein the primary, catalytically active component and cocatalyst are present as a dispersion on the nano-scale with average crystallite sizes in the range from 1 to 5 nm, on a high surface area, conductive support material.

10. The fuel cell anode according to claim 1 wherein at least one of the platinum metals selected from the group consisting of platinum, ruthenium and palladium is the primary, catalytically active component.

11. The fuel cell anode according to claim 1 wherein the primary, catalytically active component is a member selected from the group consisting of binary, ternary combination and alloys of the metals platinum, palladium and ruthenium.

12. The fuel cell anode according to claim 1 wherein the primary, catalytically active component and cocatalyst are present as a dispersion on the nano-scale with average crystallite sizes in the range from 1 to 5 nm, on a high surface area, conductive support material.

13. A method for the anodic oxidation of methanol comprising passing methanol in contact with the anode of claim 10.

14. The fuel cell anode according to claim 1 wherein the stoichiometric ratio of transition metal phthalocyanine complex to platinum metal or to platinum metals is between 0.3:1 and 1:3.

15. A method for the anodic oxidation of methanol comprising passing methanol in contact with the anode of claim 1.

16. A fuel cell containing the anode of claim 1.

17. An automobile containing the fuel cell of claim 16.

* * * * *